United States Patent [19]

Mumenthaler

[11] Patent Number: 4,809,737
[45] Date of Patent: Mar. 7, 1989

[54] VALVE

[75] Inventor: Fritz Mumenthaler, St. Gallen, Switzerland

[73] Assignee: Spuhl KG, St. Gallen, Switzerland

[21] Appl. No.: 93,635

[22] Filed: Sep. 8, 1987

[30] Foreign Application Priority Data

Jun. 23, 1987 [DE] Fed. Rep. of Germany ....... 3720738

[51] Int. Cl.⁴ .............................................. F16K 17/04
[52] U.S. Cl. ................................... 137/510; 251/335.2
[58] Field of Search ...................... 137/510; 251/335.2

[56] References Cited

U.S. PATENT DOCUMENTS 1,485,792  3/1924  McKay .............................. 251/335.2
2,585,575  2/1952  Nedergaard ......................... 137/510

FOREIGN PATENT DOCUMENTS 3431112  3/1986  Fed. Rep. of Germany .

Primary Examiner—Robert G. Nilson
Attorney, Agent, or Firm—Baker, Maxham, Jester & Meador

[57] ABSTRACT

A valve comprising a first chamber on its control or operating side, and a second chamber on its fluid side, which chambers are separated from one another by means of an uninterrupted diaphragm. The control-side chamber has a fluid outlet which is opened and closed, by means of a valve needle. The valve needle bears with its base on the uninterrupted diaphragm via a disc of a friction-reducing material such as polytetrafluoroethylene.

20 Claims, 2 Drawing Sheets

VALVE

BACKGROUND OF THE INVENTION

The invention relates to a valve comprising a casing incorporating a reception space which is subdivided by a diaphragm into a first control-side chamber which may be coupled to a control pressure via a first connector, and a second, fluid-side, chamber which may be connected to a pressurised fluid via at least one second connector, and wherein a valve needle connected to the diaphragm is displaceable with respect to its seat as a function of the control pressure, in such a way that an outlet of the second chamber is closed or opened, the diaphragm being preloaded towards the closed position of the needle by means of a spring.

DESCRIPTION OF THE PRIOR ART

The German specification DE-OS 34 31 112, the disclosure of which is incorporated herein by reference, discloses a valve of this type. This valve, like the valve of the present invention, acts as a metering valve and/or as a recirculating valve. The diaphragm has a central hole through which the jet needle is passed. Because of this, the diaphragm is at risk from rupturing however, and leakages may also occur there. This structure furthermore has the consequence that the diaphragm flips over violently upon opening and closing of the valve. This in its turn causes inaccuracies in the dosing or metering operation. In the event of breakage of the diaphragm, air bubbles, which should obviously be avoided, are liable to be carried into the fluid from the control side (air side).

An articulated joint is moreover provided between the needle and a cylinder controlling the displacement of the needle, so that the needle may be centred with respect to its seat. To this end, a plunger present in the cylinder has a tip with which it bears against the base of the needle. At this point, the base of the needle extends into the control-side chamber. The articulated joint produced in this manner has not however proved to be very effective in operation.

SUMMARY OF THE INVENTION

It is accordingly an object of the invention to provide a valve of the type described above, which is characterised in particular by a substantially better centering of the needle in its nozzle bore, in combination with a functionally reliable diaphragm structure.

This object is achieved in accordance with the invention in that the diaphragm is of uninterrupted structure and that the base of the needle bears on the diaphragm surface facing towards the second fluid side chamber via a disc of a material which reduces sliding friction, for example polytetrafluoroethylene.

The principles of the pierced diaphragm is thus abandoned and the diaphragm is produced in even and continuous form, thereby avoiding sealing problems. The movement of the diaphragm furthermore occurs at constant speed upon switching over, without the slap action of the conventional valves. The friction-reducing disc has the effect that the base of the needle may be centred automatically in the radial direction with respect to the diaphragm, a complementary coiled compression spring also contributing to this action.

Damage to the diaphragm is prevented in a particularly satisfactory way if the base of the needle is enlarged to the form of a plate, the said disc having approximately the same diameter as the plate. The needle consequently bears on the diaphragm via its base acting through a particularly large area, so that disadvantageous buckling of the diaphragm is prevented in a particularly satisfactory way.

In a preferred embodiment of the invention an insert is replaceably secured between the nozzle outlet of the casing and the needle. The nozzle orifice may easily be adapted to the conditions required in each case.

It is preferable moreover if the plunger bearing on the control side of the diaphragm and preloaded by the spring rests on the control-side surface of the diaphragm with an enlarged base. This also provides a satisfactory protection for the control-side surface of the diaphragm against deleterious bending or buckling stresses. There is no need to provide a disc of polytetrafluoroethylene or the like in this case, although this is also possible.

To reduce friction to a minimum at the point in question, it is preferred as a matter of fact for the spring to act on the plunger via a springer cap under interpositioning of a ball. This forms a ball joint at the point in question, so that the base of the plunger cannot be displaced radially with respect to the diaphragm. It is preferred furthermore if with an at least two-piece construction of the casing, the diaphragm is clamped at its rim via a sleeve or collar, and a spring washer or cup-spring preloading the said collar is provided between two parts of the casing. Comparatively great production tolerances may thereby be taken up, and the diaphragm is clamped at its rim, or rather preloaded, by means of the collar preloaded by the spring washer or cup spring.

Whereas the control pressure had been obtained via an appropriate connector in the prior art, it is preferable moreover if a cylinder is provided, which is controlled by means of a pilot valve and supplies the control pressure. Consequently, it is possible to apply closing forces which are many times greater and the switching periods are reduced appreciably.

As in the case of the prior art, a spindle which can be actuated from the outside may also be provided according to the invention, for adjustment of the spring force. In this connection, it is preferred if the spindle is screwed into an internal screw-thread of the spring cap secured against rotation. The spring is thus appropriately preloaded.

It is preferable furthermore if the spring is supported at its extremity facing away from the diaphragm, on an intermediate plate the other side of which supports another spring which preloads the cylinder. The intermediate plate thus acts as a fixed stop for the spring on the one hand, and on the other hand as a fixed stop for the other spring which preloads the cylinder, so that it returns to the initial position again upon being vented.

In a preferred embodiment the casing is constructed in three parts, two axially external cap-like parts being screwed to a tubular central part. The casing may consequently be dismantled particularly conveniently for servicing or replacement of the different components secured in the separate parts. With this construction a perforation is preferably provided in the central casing part. A leak or fracture of the diaphragm may be detected immediately through the perforation.

It is preferable furthermore, if an axial passage is incorporated in the collar. In the case of a diaphragm fracture, the fluid may drain through this passage and through the perforation in the casing, so that the other components of the valve are no longer soiled by the fluid.

Finally, it is preferred if the passage comprises an internal screw-thread. This serves the purpose of facilitating assembly, to which end it is possible to screw an appropriately threaded bolt into the internal screw-thread and then to pull the collar or sleeve out of the casing in the direction towards the control-side chamber.

Further objects and advantageous features of the invention will become apparent from the following detailed description with reference to the accompanying drawings which illustrate a preferred embodiment thereof.

DETAILED DESCRIPTION OF THE PREFERRED EMBODIMENT

Figure 1:
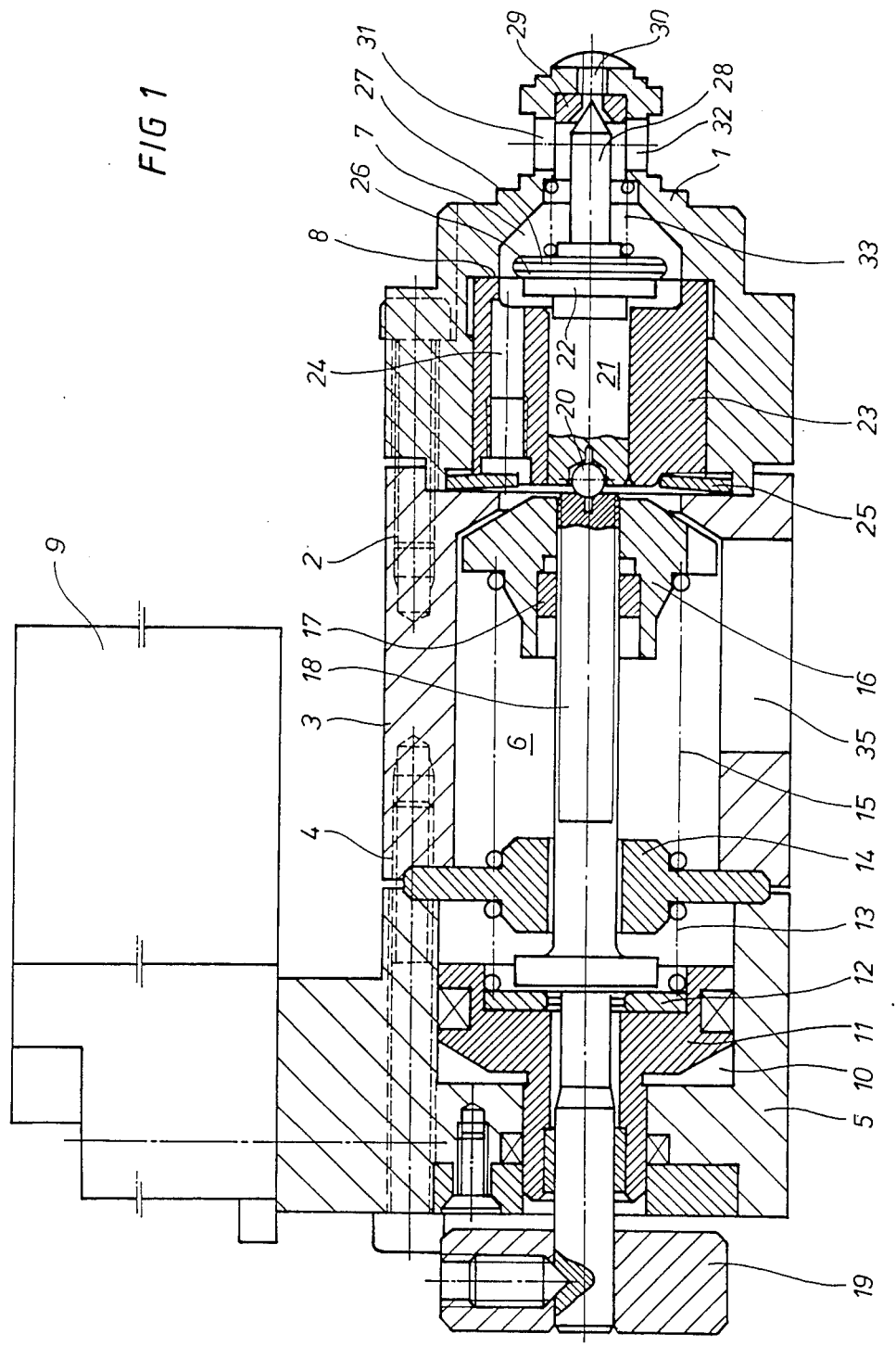
FIG. 1 shows a longitudinal cross-section through the valve according to the invention.
Figure 2:
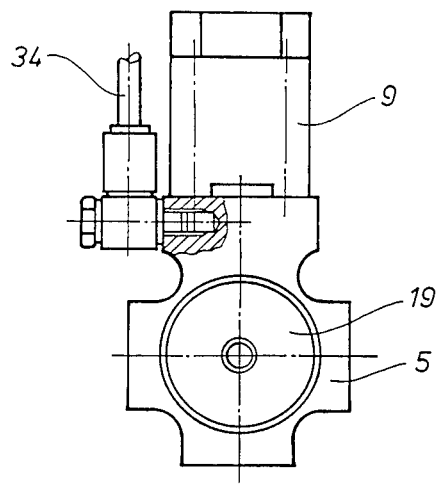
FIG. 2 shows a view in the direction of the arrow A of FIG. 1.

The valve illustrated in the drawings is constructed for application as in the case of the German specification DE-OS 34 31 112 referred to above as regards its fundamental structure and its purpose of utilisation, in which it preferably acts as a metering and/or recirculating valve and co-operates with a mixer head for reactive mixing of plastics material ingredients.

The valve shown comprises a three-piece casing, having a cap-like front casing member 1 which is secured by means of screws 2 to a tubular central casing member 3, which for its part is secured by means of screws 4 to a similarly cap-like rear casing member 5.

A first, control-side, chamber 6 and a second, fluid-side, chamber 7 are formed in the casing. The two chambers are separated from each other by means of a plane uninterrupted diaphragm 8.

Control pressure is applied to the first chamber 6 via a pilot valve 9 which pressurises a chamber 10 which is delimited to the right as seen in FIG. 1, i.e. in the direction towards the diaphragm, by a piston 11 displaceable in the axial direction.

The piston 11 has a central recess on its other side, which has inset therein a spacing ring 12 which is made of wear-resistant material and thereby prevents a spring 13 from digging into the piston 11 which is made of light metal. The other end of the spring 13 bears against an extension of an intermediate plate 14 which is fixedly installed in the casing.

The intermediate plate has an analogous extension on the other side, for supporting the left-hand (as seen in FIG. 1) end of a spring 15 the other end of which is received on a corresponding extension of a spring cap 16. The spring cap is co-rotatorily installed on a spindle 18 via an apertured plate 17. It is displaceable on the spindle in the axial direction during rotation of the spindle, the apertured plate 17 acting as a stop. The spindle may be turned by means of a handwheel 19, the spring cap then being displaced in axial direction and correspondingly preloading the spring 15. The tip of the spindle 18 has a spheroidal recess for reception of a ball 20 the other side of which is received in a corresponding recess of a piston 21. The piston has an enlarged base 22 with which it bears against the left-hand side surface of the diaphragm 8.

The diaphragm has its rim clamped fast on an inner step or shoulder of the casing 1, via a sleeve or collar 23. The collar has a passage 24 therethrough provided with an internal screw-thread. The screw thread facilitates assembly or disassembly of the valve. A bolt may be threaded into the passage so that collar 23 may be pulled out of casing 1 in the direction toward the control side chamber. Alternatively, a passage closing plug or bolt may be screwed into passage 24. At the left-hand extremity, the collar has bearing on it a spring washer or cup spring 25 which is inserted and secured between the two casing members 1 and 3.

At the other extremity, a disc 26 of polytetrafluoroethylene or other appropriate material rests on the diaphragm 8, and an enlarged base 27 of a valve needle 28 rests on the disc in its turn.

The valve needle co-operates with a seat formed by a replaceably held insert 29 which is inset from the inside into an appropriate recess of the casing member 1. The insert has a tapering passage bore which merges into a delivery orifice 30 of the valve.

Openings 31,32 for a fluid, which extend in the radial direction abreast of the needle 28, are provided in the casing member 1.

Another spring 33 resting on a shoulder of the casing, acts on the plate-like base 27 of the needle.

Operating air is supplied to the chamber 10 via a pipe 34.

As already described in the German specification DE-OS 34 31 112 referred to above, the diaphragm 8 is appropriately displaced by means of the operating air, the pilot valve or control valve 9 and the piston 11 as well as the piston 21, the needle 28 thereupon being caused thereby to open or close the delivery orifice 30 to a greater or lesser extent. In the closed condition of the mixer valve, the fluid may flow into the chamber 7 via the opening 31 and out again through the opening 32. If the delivery opening 30 is open however, the fluid may leave the valve via the delivery orifice or nozzle orifice 30.

Further details of the functioning of valves of this type are disclosed in German specification DE-OS 34 31 112.

What is claimed is:

1. A valve comprising:
   a casing formed with a delivery orifice in one end and a main chamber;
   a diaphragm having a first continuous surface and an opposite second continuous surface, said diaphragm being mounted in and dividing said main chamber into:
   a first, control-side chamber adapted to be connected to a variable operating or control pressure fluid source; and
   a second, fluid-side chamber adapted to be connected to a source of pressurized fluid and including said delivery orifice;
   a valve needle mounted in said second chamber for reciprocal motion;
   a base on said valve needle coupled to said second surface of said diaphragm;
   a low friction material disc mounted between said needle base and said diaphragm;
   valve seat means in one end of said casing adjacent said valve needle; and
   a first spring in said casing coupled to said first surface of said diaphragm to bias said diaphragm and thereby said valve needle toward the closed position in said valve seat means, the motion of said valve toward and away from said valve seat being a function of the variable fluid control pressure.

2. The valve recited in claim 1, wherein said base of said needle is enlarged to form a plate and wherein said disc has the same diameter as said plate.

3. The valve recited in claim 1, and further comprising a second spring in the form of a coiled compression spring which bears at one end against said base of said needle, its other end extending to a position adjacent said delivery orifice.

4. The valve recited in claim 1, wherein said valve seat means comprises an insert replaceably held between said delivery orifice and said needle.

5. The valve recited in claim 1, and further comprising a plunger bearing on said first surface of said diaphragm, said plunger being preloaded by said first spring, said plunger being formed with an enlarged base bearing on said first surface of said diaphragm.

6. The valve recited in claim 5, and further comprising a spring cap positioned in said main chamber between said first spring and said diaphragm; and
 a ball positioned between said plunger and said spring cap, said first spring acting on said plunger through said spring cap and said ball.

7. The valve recited in claim 6, and further comprising a spindle which can be actuated from externally of said casing to adjust the force of said first spring, wherein said spindle is screwed into an internal screw thread of said spring cap.

8. The valve recited in claim 1, wherein said casing comprises at least two casing members connected to each other, said valve further comprising:
 a spring washer coupled between said two casing members; and
 a collar means bearing on the periphery of said diaphragm, said spring washer biasing said collar means against said diaphragm thereby positively clamping said diaphragm between said collar means and a first of said two casing members.

9. The valve recited in claim 8, wherein said collar has an axial passage therethrough.

10. The valve recited in claim 9, wherein said passage has an internal screwthread.

11. The valve recited in claim 1, and further comprising a cylinder mounted in said main chamber for axial motion therein, the operating pressure on said cylinder being supplied by means of a pilot valve thereby providing operating pressure to said valve needle.

12. The valve recited in claim 11, and further comprising:
 an intermediate plate fixed within said main chamber between said cylinder and said first spring; and
 a third spring positioned between said cylinder and said intermediate plate which preloads said cylinder.

13. The valve recited in claim 1, wherein said casing is constructed in three parts comprising two cap-like members screwed to opposite axial ends of a tubular central member.

14. The valve recited in claim 1, wherein an aperture is provided in a central part of said casing opening into said first chamber.

15. A valve comprising:
 a casing formed with a delivery orifice in one end and a main chamber;
 a diaphragm having a first continuous surface and an opposite second continuous surface, said diaphragm being mounted in and dividing said main chamber into:
 a first, control-side chamber adapted to be connected to a variable operating or control pressure fluid source; and
 a second, fluid-side chamber adapted to be connected to a source of pressurized fluid and including said delivery orifice;
 a valve needle mounted in said second chamber for reciprocal motion;
 a base on said valve needle coupled to said second surface of said diaphragm;
 a low friction material disc mounted between said needle base and said diaphragm;
 valve seat means in one end of said casing adjacent said valve needle;
 a first spring in said casing coupled to said first surface of said diaphragm to bias said diaphragm and thereby said valve needle toward the closed position in said valve seat means, the motion of said valve toward and away from said valve seat being a function of the variable fluid control pressure;
 a plunger bearing on said first surface of said diaphragm, said plunger being preloaded by said first spring, said plunger being formed with an enlarged base bearing on said first surface of said diaphragm;
 a spring cap positioned in said main chamber between said first spring and said diaphragm;
 a ball positioned between said plunger and said spring cap, said first spring acting on said plunger through said spring cap and said ball; and
 a spindle which can be actuated from externally of said casing to adjust the force of said first spring wherein said spindle is screwed into an internal screwthread of said spring cap.

16. A valve comprising:
 a casing comprising at least two casing members connected to each other and formed with a delivery orifice in one end and a main chamber;
 a diaphragm having a first continuous surface and an opposite second continuous surface, said diaphragm being mounted in and dividing said main chamber into:
 a first, control-side chamber adapted to be connected to a variable operating or control pressure fluid source; and
 a second, fluid-side chamber adapted to be connected to a source of pressurized fluid and including said delivery orifice;
 a valve needle mounted in said second chamber for reciprocal motion;
 a base on said valve needle coupled to said second surface of said diaphragm;
 a low friction material disc mounted between said needle base and said diaphragm;
 valve seat means in one end of said casing adjacent said valve needle;
 a first spring in said casing coupled to said first surface of said diaphragm to bias said diaphragm and thereby said valve needle toward the closed position in said valve seat means, the motion of said valve toward and away from said valve seat being a function of the variable fluid control pressure;
 a spring washer coupled between said two casing members; and
 collar means bearing on the periphery of said diaphragm, said spring washer biasing said collar means against said diaphragm thereby positively clamping said diaphragm between said collar means and a first of said two casing members.

17. The valve recited in claim 16, wherein said collar has an axial passage therethrough.

18. The valve recited in claim 17, wherein said passage has an internal screwthread.

19. A valve comprising:
a casing formed with a delivery orifice in one end and a main chamber;
a diaphragm having a first continuous surface and an opposite second continuous surface, said diaphragm being mounted in and dividing said main chamber into:
a first, control-side chamber adapted to be connected to a variable operating or control pressure fluid source; and
a second, fluid-side chamber adapted to be connected to a source of pressurized fluid and including said delivery orifice;
a valve needle mounted in said second chamber for reciprocal motion;
a base on said valve needle coupled to said second surface of said diaphragm;
a low friction material disc mounted between said needle base and said diaphragm;
valve seat means in one end of said casing adjacent said valve needle;
a first spring in said casing coupled to said first surface of said diaphragm to bias said diaphragm and thereby said valve needle toward the closed position in said valve seat means, the motion of said valve toward and away from said valve seat being a function of the variable fluid control pressure; and
a cylinder mounted in said main chamber for axial motion therein, the operating pressure on said cylinder being supplied by means of a pilot valve thereby providing operating pressure to said valve needle.

20. The valve recited in claim 19, and further comprising:
an intermediate plate fixed within said main chamber between said cylinder and said first spring; and
a third spring positioned between said cylinder and said intermediate plate which preloads said cylinder.

* * * * *